(12) United States Patent
Maier (10) Patent No.: US 8,240,754 B2
(45) Date of Patent: Aug. 14, 2012

(54) MOTOR VEHICLE SEAT HAVING A WING REST HAVING COVER PLATE AND SEATING CONFIGURATION HAVING SUCH A MOTOR VEHICLE SEAT

(75) Inventor: Jürgen Maier, Weitersweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 12/420,528

(22) Filed: Apr. 8, 2009

(65) Prior Publication Data

US 2009/0250984 A1    Oct. 8, 2009

(30) Foreign Application Priority Data

Apr. 8, 2008  (DE) .......................... 10 2008 017 709

(51) Int. Cl.
*A47C 13/00* (2006.01)
(52) U.S. Cl. ........ 297/112; 297/113; 297/232; 297/116; 297/411.34; 297/452.4
(58) Field of Classification Search .................. 297/115, 297/113, 112, 125, 238, 233, 232, 452.4, 297/334.1, 188.05, 182, 116, 411.34, 411.29
See application file for complete search history.

(56) References Cited

U.S. PATENT DOCUMENTS

| | | | | |
|---|---|---|---|---|
| 90,613 A | * | 5/1869 | Vogel | 297/237 |
| 557,063 A | * | 3/1896 | Faneuf | 297/256 |
| 1,500,524 A | | 7/1924 | Armrest | |
| 1,886,595 A | * | 11/1932 | Sandquist | 4/239 |
| 2,584,481 A | | 2/1952 | Mast et al. | |
| 2,621,708 A | | 12/1952 | Luce, Jr. | |

(Continued)

FOREIGN PATENT DOCUMENTS

CH             265453 A    12/1949

(Continued)

OTHER PUBLICATIONS

USPTO, US Office Action for U.S. Appl. No. 12/419,564, dated Jun. 10, 2011.

(Continued)

*Primary Examiner* — David Dunn
*Assistant Examiner* — David E Allred
(74) *Attorney, Agent, or Firm* — Ingrassia Fisher & Lorenz, P.C.

(57) ABSTRACT

A motor vehicle seat is provided that includes, but is not limited to a backrest, which may be pivoted from an essentially upright usage position into an essentially horizontal non-usage position and which has at least one wing rest, which includes, but is not limited to a support part and a cushion part fastened on the support part. The support part is linked on a middle backrest part in such a way that the wing rest may be pivoted, in the non-usage position of the backrest, from a lower armrest non-usage position around the pivot axis extending in the seat direction into an upper armrest usage position to implement an armrest. In the armrest usage position, the cushion part is situated above the middle backrest part while implementing an intermediate space between the cushion part and the middle backrest part. The support part has a cover plate, which covers the intermediate space in one transverse direction. Furthermore, a seating configuration is provided having such a motor vehicle seat.

14 Claims, 3 Drawing Sheets

U.S. PATENT DOCUMENTS

| | | | |
|---|---|---|---|
| 2,688,524 A | 9/1954 | Hodgman | |
| 2,720,658 A | 10/1955 | Lea | |
| 2,980,170 A | 4/1961 | Bechtold | |
| 3,094,354 A * | 6/1963 | Bernier | 297/112 |
| 3,328,077 A | 6/1967 | Krasinski | |
| 3,565,482 A | 2/1971 | Blodee | |
| 3,913,973 A | 10/1975 | Mintz et al. | |
| 3,926,473 A * | 12/1975 | Hogan | 297/115 |
| 4,519,646 A | 5/1985 | Leitermann et al. | |
| 4,796,955 A | 1/1989 | Williams | |
| 5,052,068 A | 10/1991 | Graebe | |
| 5,161,854 A * | 11/1992 | Yokoto et al. | 297/182 |
| 5,193,765 A * | 3/1993 | Simpson et al. | 244/118.6 |
| 5,344,213 A | 9/1994 | Koyanagi | |
| 5,384,946 A * | 1/1995 | Sundstedt et al. | 297/238 |
| 5,409,297 A | 4/1995 | De Filippo | |
| 5,558,398 A | 9/1996 | Santos | |
| 5,722,703 A | 3/1998 | Iwamoto et al. | |
| 5,771,539 A | 6/1998 | Wahlstedt et al. | |
| 5,788,324 A | 8/1998 | Shea et al. | |
| 5,834,946 A | 11/1998 | Albrow et al. | |
| 5,896,604 A | 4/1999 | McLean | |
| 5,947,554 A | 9/1999 | Mashkevich | |
| 5,951,084 A * | 9/1999 | Okazaki et al. | 296/37.16 |
| 6,003,927 A | 12/1999 | Koerber et al. | |
| 6,033,015 A | 3/2000 | Husted | |
| 6,039,141 A | 3/2000 | Denny | |
| 6,132,128 A | 10/2000 | Burrows | |
| 6,176,547 B1 | 1/2001 | Francois et al. | |
| 6,189,458 B1 | 2/2001 | Rivera | |
| 6,286,793 B1 | 9/2001 | Hirose et al. | |
| 6,513,876 B1 | 2/2003 | Agler et al. | |
| 6,547,323 B1 * | 4/2003 | Aitken et al. | 297/113 |
| 6,578,915 B2 | 6/2003 | Jonas et al. | |
| 6,793,282 B2 * | 9/2004 | Plant et al. | 297/248 |
| 6,840,577 B2 | 1/2005 | Watkins | |
| 6,896,331 B2 * | 5/2005 | Kassai et al. | 297/354.13 |
| 6,918,159 B2 | 7/2005 | Choi | |
| 7,104,609 B2 | 9/2006 | Kim | |
| 7,380,859 B2 | 6/2008 | Gardiner | |
| 7,419,216 B2 | 9/2008 | Hunziker | |
| 7,543,891 B2 | 6/2009 | Chung | |
| 7,677,656 B2 * | 3/2010 | Saberan et al. | 297/188.04 |
| 7,850,244 B2 | 12/2010 | Salewski | |
| 7,967,386 B2 * | 6/2011 | Na | 297/378.1 |
| 2002/0089220 A1 | 7/2002 | Achleitner et al. | |
| 2002/0109388 A1 | 8/2002 | Magnuson | |
| 2004/0036339 A1 | 2/2004 | Christoffel et al. | |
| 2004/0084948 A1 | 5/2004 | Glynn et al. | |
| 2006/0001304 A1 | 1/2006 | Walker et al. | |
| 2006/0076795 A1 * | 4/2006 | Slade | 296/64 |
| 2007/0052264 A1 | 3/2007 | Lee | |
| 2008/0036258 A1 | 2/2008 | Holdampf et al. | |
| 2009/0230712 A1 | 9/2009 | Maier et al. | |
| 2009/0236885 A1 | 9/2009 | Maier et al. | |
| 2009/0250983 A1 | 10/2009 | Maier et al. | |
| 2009/0250985 A1 * | 10/2009 | Maier | 297/257 |
| 2009/0250987 A1 * | 10/2009 | Maier | 297/257 |
| 2009/0267398 A1 | 10/2009 | Na | |
| 2010/0244478 A1 | 9/2010 | DePue | |
| 2011/0133536 A1 | 6/2011 | Junige et al. | |
| 2011/0156452 A1 | 6/2011 | Schumm et al. | |

FOREIGN PATENT DOCUMENTS

| | | |
|---|---|---|
| DE | 916754 C | 8/1954 |
| DE | 1938500 U | 5/1966 |
| DE | 2509642 A1 | 9/1976 |
| DE | 2507848 A1 | 9/1979 |
| DE | 2935946 A1 | 3/1981 |
| DE | 8107888 U1 | 3/1981 |
| DE | 3147656 A1 | 6/1983 |
| DE | 3300993 A1 | 7/1984 |
| DE | 3619944 A1 | 12/1987 |
| DE | 4343242 A1 | 6/1995 |
| DE | 29517861 U1 | 1/1996 |
| DE | 29518897 U1 | 1/1996 |
| DE | 4441011 C1 | 3/1996 |
| DE | 19646470 A1 | 5/1998 |
| DE | 19746736 A1 | 4/1999 |
| DE | 19812137 A1 | 9/1999 |
| DE | 29915349 U1 | 1/2000 |
| DE | 20000479 U1 | 6/2001 |
| DE | 10012831 A1 | 9/2001 |
| DE | 20110317 U1 | 9/2001 |
| DE | 10052838 A1 | 5/2002 |
| DE | 10312041 A1 | 9/2004 |
| DE | 20320522 U1 | 10/2004 |
| DE | 10357630 A1 | 7/2005 |
| DE | 102004062942 A1 | 2/2006 |
| DE | 102004055569 A1 | 5/2006 |
| DE | 102005037785 A1 | 2/2007 |
| DE | 102005055138 A1 | 5/2007 |
| DE | 102006015180 A1 | 10/2007 |
| DE | 102006028453 A1 | 12/2007 |
| DE | 102008004232 B3 | 4/2009 |
| DE | 102008036227 A1 | 2/2010 |
| EP | 0104040 A2 | 3/1984 |
| EP | 0296939 A1 | 12/1988 |
| EP | 0566213 A2 | 10/1993 |
| EP | 0607758 A1 | 7/1994 |
| EP | 0943482 A2 | 9/1999 |
| EP | 0943483 A2 | 9/1999 |
| EP | 1728677 A1 | 12/2006 |
| EP | 1731351 A1 | 12/2006 |
| EP | 1772131 A1 | 4/2007 |
| FR | 1401166 A | 6/1965 |
| FR | 2816555 A1 | 5/2002 |
| JP | 59137832 U | 9/1984 |
| JP | 2004065762 A | 3/2004 |
| WO | 2004106108 A1 | 12/2004 |
| WO | 2006084393 A2 | 8/2006 |

OTHER PUBLICATIONS

USPTO, US Office Action for U.S. Appl. No. 12/419,571, dated Apr. 1, 2011.

Response to US Office Action for U.S. Appl. No. 12/419,571, dated Jun. 28, 2011.

USPTO, US Office Action for U.S. Appl. No. 12/419,848, dated Apr. 8, 2011.

Response to US Office Action for U.S. Appl. No. 12/419,848, dated Jul. 6, 2011.

USPTO, Notice of Allowance issued in U.S. Appl. No. 12/419,571, mailed Nov. 4, 2011.

USPTO, Office Action issued in U.S. Appl. No. 12/419,564, dated Nov. 21, 2011.

Response to U.S. Office Action for U.S. Appl. No. 12/419,564, dated Sep. 9, 2011.

USPTO, Final Office Action issued in U.S. Appl. No. 12/420,528, dated Nov. 20, 2011.

German Patent Office, German Search Report for Application No. 102008017708.3, dated Dec. 9, 2008.

German Patent Office, German Search Report for Application No. 102008017707.5, dated Apr. 22, 2009.

German Patent Office, German Search Report for Application No. 102008017712.1, dated Apr. 22, 2009.

German Patent Office, German Search Report for Application No. 102008017709.1, dated Apr. 22, 2009.

UK IPO, British Search Report for Application No. 0905934.6, dated May 13, 2009.

UK IPO, British Search Report for Application No. 0905929.6, dated Jul. 10, 2009.

UK IPO, British Search Report for Application No. 0905935.3, dated Jul. 30, 2009.

UK IPO, British Search Report for Application No. 0905928.8, dated Jul. 30, 2009.

UK IPO, British Examination Report for Application No. 0905928.8, dated Nov. 18, 2011.

UK IPO, British Examination Report for Application No. 0905928.8, dated Feb. 1, 2012.

UK IPO, British Examination Report for Application No. 0905929.6, dated Feb. 7, 2012.

UK IPO, British Examination Report for Application No. 0905934.6, dated Feb. 17, 2012.
UK IPO, British Examination Report for Application No. 0905935.3, dated Mar. 7, 2012.
USPTO, Final Office Action issued in U.S. Appl. No. 12/419,848, dated Oct. 20, 2011.
Response to US Office Action for U.S. Appl. No. 12/419,564, dated Feb. 21, 2012.
Response to US Final Office Action for U.S. Appl. No. 12/419,848, dated Mar. 20, 2012.
USPTO, Notice of Allowance issued in U.S. Appl. No. 12/419,571, dated Sep. 26, 2011.
USPTO, Notice of Allowance issued in U.S. Appl. No. 12/419,571, dated Mar. 20, 2012.
Chinese Patent Office, Chinese Office Action for Application No. 200910133083.0, date Mar. 31, 2012.
USPTO, Notice of Allowance issued in U.S. Appl. No. 12/419,571, dated Apr. 16, 2012.
USPTO, Office Action issued in U.S. Appl. No. 12/419,848, dated Apr. 27, 2012.
USPTO, Non-final Office Action issued in U.S. Appl. No. 12/419,564, dated May 31, 2012.

* cited by examiner

MOTOR VEHICLE SEAT HAVING A WING REST HAVING COVER PLATE AND SEATING CONFIGURATION HAVING SUCH A MOTOR VEHICLE SEAT

CROSS-REFERENCE TO RELATED APPLICATION

This application claims priority to German Patent Application No. 102008017709.1, filed Apr. 8, 2008, which is incorporated herein by reference in its entirety.

TECHNICAL FIELD

The present invention relates to a motor vehicle seat having a backrest, which is pivotable from an essentially upright usage position into an essentially horizontal non-usage position and has at least one wing rest, which comprises a support part and a cushion part fastened thereon, the support part being linked to a middle backrest part in such a way that the wing rest, in the non-usage position of the backrest, may be pivoted from a lower armrest non-usage position around a pivot axis extending in the seat direction into an upper armrest usage position to implement an armrest, in which the cushion part is situated above the middle backrest part while implementing an intermediate space between the cushion part and the middle backrest part. The present invention further relates to a seating configuration having such a motor vehicle seat.

BACKGROUND

Motor vehicle seats having a backrest are known from the prior art, the backrest in able to be pivoted forward from a usage position into a non-usage position. The backrest pivoted into the non-usage position and/or parts thereof may subsequently be used as an armrest for an adjacent motor vehicle seat.

Thus, EP 0 943 482 B1 describes a motor vehicle seat within a seating configuration, which has a backrest which is foldable forward. The backrest in turn has wing rests situated laterally on a middle backrest part. The known wing rests comprise a support part in the form of multiple pivot arms and a cushion part fastened on the support part. The support part in the form of the pivot arms is linked to the middle backrest part in such a way that the particular wing rest may be pivoted from a lower armrest non-usage position around a pivot axis extending in the seat direction into an upper armrest usage position, if the backrest is in the non-usage position. In the upper armrest usage position, the cushion part is situated above the middle backrest part, so that an intermediate space is implemented between the cushion part and the middle backrest part.

The known motor vehicle seat has proven itself, but is disadvantageous in that there is an increased danger of injury to the vehicle occupants, in particular when the wing rests are pivoted back from the armrest usage position into the lower armrest non-usage position. In addition, the known mechanism for the adjustment of the wing rests is not flexibly employable or usable in such a way as would be desirable to allow an especially flexible adaptation of the motor vehicle seat or the vehicle interior to the particular use by the vehicle occupants.

It is therefore at least one object of the present invention to provide a motor vehicle seat of the type according to the species, from which there is only a slight danger of injury to the vehicle occupants and which allows an especially flexible usage by the vehicle occupants. Furthermore, another object of providing includes a seating configuration having the above-mentioned advantages. In addition, other objects, desirable features, and characteristics will become apparent from the subsequent summary and detailed description, and the appended claims, taken in conjunction with the accompanying drawings and the foregoing technical field and background.

SUMMARY

The motor vehicle seat according to an embodiment of the invention has a backrest which may be pivoted from an essentially upright usage position into an essentially horizontal non-usage position. Furthermore, the backrest has at least one wing rest, which is composed of a preferably rigid support part and a cushion part, which is fastened to the support part. The support part is linked to a middle backrest part, for example, to its back, in such a way that the wing rest, in the non-usage position of the backrest, may be pivoted from a lower armrest non-usage position around a pivot axis extending in the seat direction into an upper armrest usage position to implement an armrest. The wing rest may thus implement the armrest for an adjacent motor vehicle seat within the same row of seats in the upper armrest usage position, for example. In the upper armrest usage position, the cushion part of the wing rest is situated above the middle backrest part, an intermediate space being implemented between the cushion part and the middle backrest part. The support part has a cover plate, which covers the intermediate space in a transverse direction (i.e., the intermediate space is entirely or partially closed and/or delimited in this transverse direction by the cover plate of the support part). The cover plate may thus completely implement the support part, for example, but it is also possible that the cover plate only forms a part of the support part.

The cover plate on the support part has the advantage that the vehicle occupant may not put his fingers so easily into the intermediate space between the cushion part and the middle backrest part when the wing rest is pivoted back from the upper armrest usage position into the lower armrest non-usage position. In this way, the danger of injury is significantly less with the motor vehicle seat according to the invention than with the motor vehicle seat known from EP 0 943 482 B1, in which pinching of the fingers of the vehicle occupant between the pivot arms of the support part and the middle backrest part may occur especially easily if the vehicle occupant grasps one of the pivot arms in order to actuate the wing rest. In addition, an intermediate space between the cushion part and the middle backrest part is provided by the cover plate on the support part of the wing rest, which may be used especially securely as a storage space for cargo, in particular because the cargo may not fall or slip out in the transverse direction. An especially flexible usage of the motor vehicle seat according to an embodiment of the invention, also for accommodating cargo, is thus ensured.

In order to extensively prevent a danger of injury to the vehicle occupant and ensure an especially secure accommodation of the cargo inside the intermediate space, in a preferred embodiment of the motor vehicle seat according to the invention, the cover plate extends over the entire length and/or height of the intermediate space.

In a further preferred embodiment of the motor vehicle seat according to the invention, the cover plate of the support part entirely or partially covers a back of the middle backrest part in the armrest non-usage position of the wing rest. In this way, the cover plate may be used for protecting the back of the middle backrest part when the wing rest is located in the armrest non-usage position. In this way, the cover plate may thus assume a further function. The cover plate of the support part preferably extends parallel to the back of the middle backrest part in the armrest non-usage position.

In a further preferred embodiment of the motor vehicle seat according to the invention, to achieve an especially compact construction, the cover plate is supported flatly on the back of the middle backrest part in the armrest non-usage position of the wing rest. This also largely prevents dirt or objects from being able to get between the cover plate and the back of the middle backrest part when the wing rest is in the armrest non-usage position.

In an especially preferred embodiment of the motor vehicle seat according to the invention, receptacle depressions are provided in the back of the middle backrest part, which are concealed by the cover plate in the armrest non-usage position of the wing rest and are accessible in the armrest usage position of the wing rest. Thus, objects such as mobile telephones, MP3 players, pens, etc. may be introduced into the receptacle depressions, in order to store them securely, in the armrest usage position of the wing rest. If the wing rest is subsequently pivoted back into the armrest non-usage position, the receptacle depressions having the objects located therein are concealed in such a way that the objects are stowed securely and captively. If needed, the wing rest may be pivoted back into the armrest usage position, in order to be able to access the objects again.

In an advantageous embodiment of the motor vehicle seat according to the invention, the cover plate of the support part is situated flatly on a back of the cushion part in both the armrest non-usage position and also the armrest usage position of the wing rest. In this way, the cover plate also protects the back of the cushion part, so that damage to the cushion part may be prevented in the armrest non-usage position in particular.

In order that the cover plate of the support part may protect the backs of the middle backrest part and the cushion part and delimit the intermediate space, on the one hand, but does not represent a risk of injury to the vehicle occupants, on the other hand, in a further advantageous embodiment of the motor vehicle seat according to the invention, the side of the cover plate facing away from the intermediate space is provided with a soft cover layer, preferably a carpet. The danger of injury is thus low, even if the vehicle occupant strikes against the side of the cover plate facing away from the intermediate space.

In order to achieve a low weight of the support part, on the one hand, and a high stability thereof, on the other hand, in a further especially preferred embodiment of the motor vehicle seat according to the invention, the support part has at least one pivot arm, which is linked so it is pivotable on the middle backrest part around the pivot axis extending in the seat direction, the cover plate covering the pivot arm in the transverse direction in the armrest usage position of the wing rest. In this embodiment, the cover plate alone is not used as the support part, but rather the at least one pivot arm is used for securely supporting and guiding the wing rest, while the cover plate may be implemented as especially thin and thus lightweight in this case.

In order to achieve an especially compact construction, in a further advantageous embodiment of the motor vehicle seat according to the invention, an elongate depression is provided in the back of the middle backrest part, in which the pivot arm lies in the armrest non-usage position of the wing rest. In this case, the pivot arms is preferably situated flush with or lower than the back of the middle backrest part.

In order to further reduce the danger of injury originating from the motor vehicle seat and to provide an intermediate space between the cushion part and the middle backrest part, which ensures an especially secure accommodation of cargo, in a further especially preferred embodiment of the motor vehicle seat according to the invention, a planar formation is also provided, which is situated on the cushion part, on the one hand, and on the middle backrest part, on the other hand, and covers the intermediate space in the opposite transverse direction. Such a planar formation may be a material web, for example. Thanks to the planar formation, the vehicle occupant may no longer reach laterally into the intermediate space so easily and/or at all, by which the danger of injury is minimized. In addition, the cargo inside the intermediate space may no longer fall or slip out laterally from the intermediate space in one of the two transverse directions.

According to a further preferred embodiment of the motor vehicle seat according to the invention, the planar formation is implemented as flexible and/or foldable. In this way, especially simple stowing of the planar formation is possible, if the wing rest is in the armrest non-usage position. The planar formation is preferably implemented as elastic. The planar formation may thus be an elastic material web, for example. In addition, it would be advantageous if the planar formation were situated removably on the cushion part and/or the middle backrest part, so that the vehicle occupant may decide whether or not he uses the planar formation to implement the intermediate space as a storage space.

In order to be able to stow the planar formation securely and easily in the armrest non-usage position, in a further preferred embodiment of the motor vehicle seat according to the invention, the planar formation is situated between the transverse sides of the middle backrest part and the cushion part facing toward one another in the armrest non-usage position of the wing rest.

According to a further advantageous embodiment of the motor vehicle seat according to the invention, the intermediate space is implemented as tubular having an opening pointing forward in the seat direction and/or to the rear opposite to the seat direction.

In a further advantageous embodiment of the motor vehicle seat according to the invention, the cover plate is situated parallel to the back of the middle backrest part in the armrest non-usage position of the wing rest and perpendicular to the back of the middle backrest part in the armrest usage position of the wing rest.

In a further especially preferred embodiment of the motor vehicle seat according to the invention, the motor vehicle seat has two wing rests of the type cited, each situated in one transverse direction on the middle backrest part. The motor vehicle seat may thus be used both to implement an armrest for a further motor vehicle seat situated in one transverse direction adjacent to the motor vehicle seat and also to implement an armrest for a further motor vehicle seat situated in the opposite transverse direction adjacent to the motor vehicle seat.

The seating configuration according to the invention has a first motor vehicle seat of the above-mentioned type. Furthermore, a second motor vehicle seat is provided, the first and second motor vehicle seats being situated adjacent to one another in a row of seats. A wing rest of the first motor vehicle seat is situated on the side of the first motor vehicle seat facing toward the second motor vehicle seat and may thus be used to implement an armrest for the second motor vehicle seat. In a preferred embodiment of the seating configuration according to the invention, a third motor vehicle seat is also provided in the row of seats, the first motor vehicle seat being situated between the second and third motor vehicle seats in the row of seats. One wing rest may thus be used to implement an armrest for the second motor vehicle seat and the other wing rest may be used to implement an armrest for the third motor vehicle seat.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
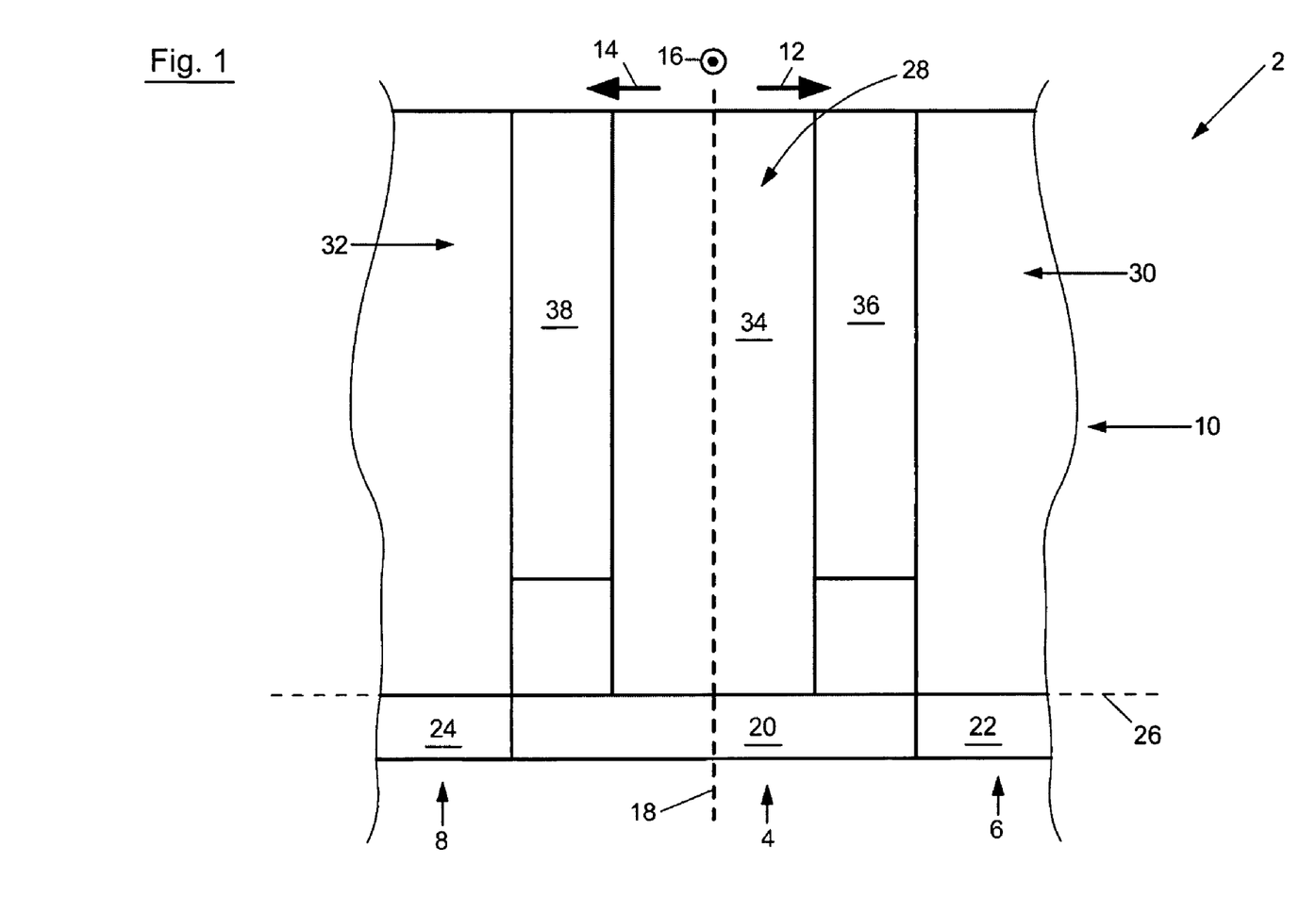
FIG. 1 shows a schematic front view of the seating configuration according to an embodiment of the invention having the motor vehicle seat with the backrest in the usage position.

FIG. 1 shows a front view of the seating configuration 2 according to an embodiment of the invention. The seating configuration 2 comprises a middle first motor vehicle seat 4, a second motor vehicle seat 6, and a third motor vehicle seat 8, which are situated adjacent to one another in a row of seats 10. The second motor vehicle seat 6 is situated adjacent to the first motor vehicle seat 4 in one transverse direction 12, while the third motor vehicle seat 8 is situated adjacent to the first motor vehicle seat 4 in the opposite transverse direction 14. The seat direction 16 is identical for all motor vehicle seats 4, 6, 8 and corresponds to the normal of the drawing page in FIG. 1. In addition, the vertical direction 18 of the seating configuration 2 and/or the motor vehicle seats 4, 6, 8 is indicated on the basis of a dashed vertical axis in FIG. 1.

The first motor vehicle seat 4 represents an embodiment of the motor vehicle seat according to the invention, while the motor vehicle seats 6, 8 may be typical motor vehicle seats. Alternatively, however, the second and third motor vehicle seats 6, 8 may be implemented like the first motor vehicle seat 4. All motor vehicle seats 4, 6, 8 each comprise a seat part 20, 22, 24 and a backrest 28, 30, 32, which is situated so it is pivotable around a first pivot axis 26 on the particular seat part 20, 22, 24. The backrests 28, 30, 32 may be pivoted around the pivot axis 26 independently of one another.

The backrest 28 of the first motor vehicle seat 4 is essentially composed of a middle backrest part 34 and two wing rests 36, 38 fastened laterally thereon. While the wing rest 36 is situated laterally on the middle backrest part 34 in the transverse direction 12 and thus faces toward the second motor vehicle seat 6, the wing rest 38 is situated laterally on the backrest part 34 in the transverse direction 14 and thus faces toward the third motor vehicle seat 8.

Figure 2:
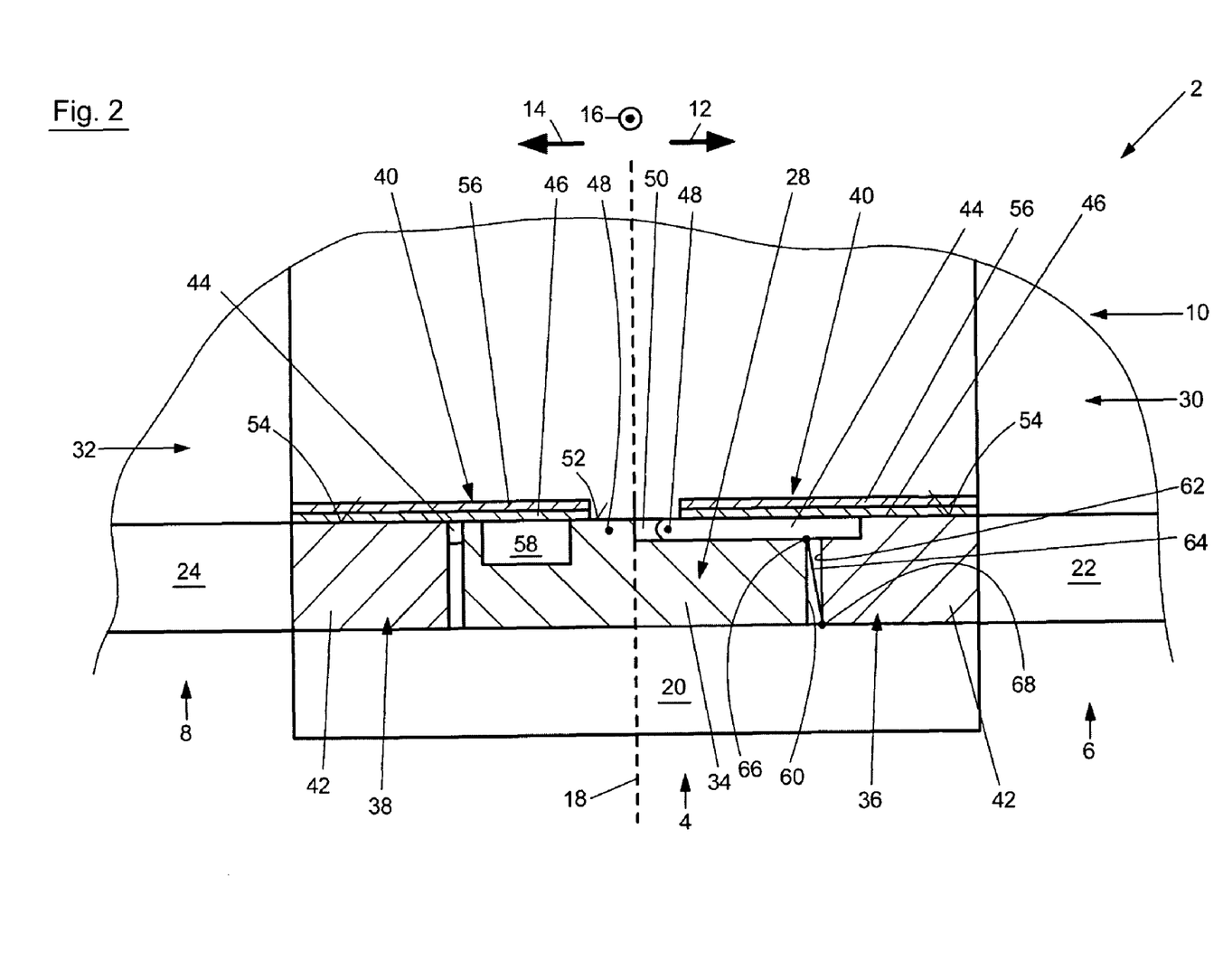
FIG. 2 shows the seating configuration of FIG. 1 with the backrest in the non-usage position.

The backrest 28 of the first motor vehicle seat 4 may be pivoted, together with the middle backrest part 34 and the two wing rests 36, 38, from an essentially upright usage position, which is shown in FIG. 1, around the first pivot axis 26 in the seat direction 16 forward into an essentially horizontal non-usage position, which is shown in FIG. 2. As is obvious from FIG. 2, the seat part 20 of the first motor vehicle seat 4 sinks downward in the vertical direction 18 during the pivot movement of the backrest 28 around the pivot axis 26 far enough that the top side of the seat part 20 is situated below or at a level with the bottom side of the seat parts 22, 24 of the second and third motor vehicle seats 6, 8, this function being discussed once again hereafter.

Furthermore, it is obvious from FIG. 2 that the wing rests 36, 38 are each composed of a support part 40 and a cushion part 42. Both wing rests 36, 38 are implemented identically, the left half of FIG. 2 showing a cross-section through the backrest 28, which was performed in another sectional plane than the cross-section in the right half of FIG. 2. A planar formation was also dispensed with in the left half of FIG. 2, this feature being discussed in greater detail hereafter.

The cushion part 42 is fastened on the support part 40, the cushion part 40 having at least one pivot arm 44 and one cover plate 46. The pivot arm 44 of the support part 40 is linked on the middle backrest part 34 so it is pivotable around a second pivot axis 48. The second pivot axis 48 extends in the seat direction 16 in the non-usage position of the backrest 28, which is shown in FIG. 2.

In the lower armrest non-usage position of the wing rest 36, 38, shown in FIG. 2, the pivot arms 44 each lie in an elongate depression 50 in the back 52 of the middle backrest part 34, the elongate depression 50 being visible in particular on the right side of FIG. 2. The pivot arm 44 lies in the elongate depression 50 in such a way that it is flush with the back 52 of the middle backrest part 34. However, it would also be possible that the pivot arm 44 lies far enough in the elongate depression 50 in the armrest non-usage position of the wing rests 36, 38 that it is situated lower than the back 52 of the middle backrest part 34.

The cover plate 46, which may be fastened both on the pivot arm 44 and also the cushion part 42, covers both a part of the back 52 of the middle backrest part 34 and also the back 54 of the cushion part 42 in the armrest non-usage position of the wing rests 36, 38. The cover plate 46 extends parallel to the backs 52, 54 and is supported flatly on the cited backs 52, 54. A cover layer 56, which is implemented as softer than the cover plate 46, is situated on the side of the cover plate 46 facing away from the pivot arm 44 or the cushion part 42. This cover layer 56 may preferably be a carpet.

Furthermore, a receptacle depression 58, which is provided in the back 52 of the middle backrest part 34, is indicated in the left half of FIG. 2. The receptacle depression 58 may be used to accommodate objects. In the armrest non-usage position of the wing rests 36, 38 shown in FIG. 2, the receptacle depression 58 is concealed by the cover plate 46, however, so that objects inside the receptacle depression 58 are accommodated captively and inaccessibly therein.

The middle backrest part 34 has a transverse side 60 which, in the armrest non-usage position of the wing rests 36, 38 shown in FIG. 2, faces toward a transverse side 62 of the cushion part 42. A flexible and/or foldable planar formation 64, which is preferably implemented as elastic, is situated between the transverse sides 60, 62. This planar formation 64 may be an elastic material web, for example. Such a planar formation was dispensed with on the left side of FIG. 2, such a planar formation also fundamentally being able to be provided here. The planar formation 64 is fastened at one edge on a fastening point 66 on the middle backrest part 34 and at the opposite edge on a fastening point 68 on the cushion part 42.

As already noted, the wing rests 36, 38 are located in FIG. 2 in the lower armrest non-usage position, in which the cover plate 46 is situated parallel to the back 52 of the middle backrest part 34 and the wing rests 36, 38 are situated to the sides of the middle backrest part 34. Starting from this lower armrest non-usage position, the wing rests 36, 38 may be pivoted around the pivot axis 48, which extends in the seat direction 16, by about 90° into an upper armrest usage position, which is shown in FIG. 3.

In the upper armrest usage position, the cushion parts 42 of the wing rests 36, 38 implement an armrest for the second motor vehicle seat 6 or the third motor vehicle seat 8, respectively. Fundamentally, the two wing rests 36, 38 may be pivoted independently of one another into the armrest usage position shown in FIG. 3. Because the seat part 20 of the first motor vehicle seat 4 was lowered into the non-usage position shown in FIG. 2 during the pivoting of the backrest 28 and has thus shortened the width of the backrest 28 in the transverse direction 12 or 14, the second motor vehicle seat 6 may be shifted in the transverse direction 14 and the third motor vehicle seat 8 may be shifted in the transverse direction 12, in order to be situated closer to the wing rests 36, 38, as indicated on the basis of the arrows 70 in FIG. 3.

In the upper armrest usage position, the cushion part 42 is situated above the back 52 of the middle backrest part 34 in the vertical direction 18, so that an intermediate space 72 is implemented between the cushion part 42 and the middle backrest part 34. The intermediate space 72 of the wing rest 36 is covered in the transverse direction 14 by the cover plate 46, the cover plate 46 extending over the entire length and height of the intermediate space 72. Correspondingly, the intermediate space 72 of the wing rest 38 is covered and/or delimited in the transverse direction 12 by the cover plate 46, the cover plate 46 also extending over the entire length and height of the intermediate space 72 in this case.

Figure 3:
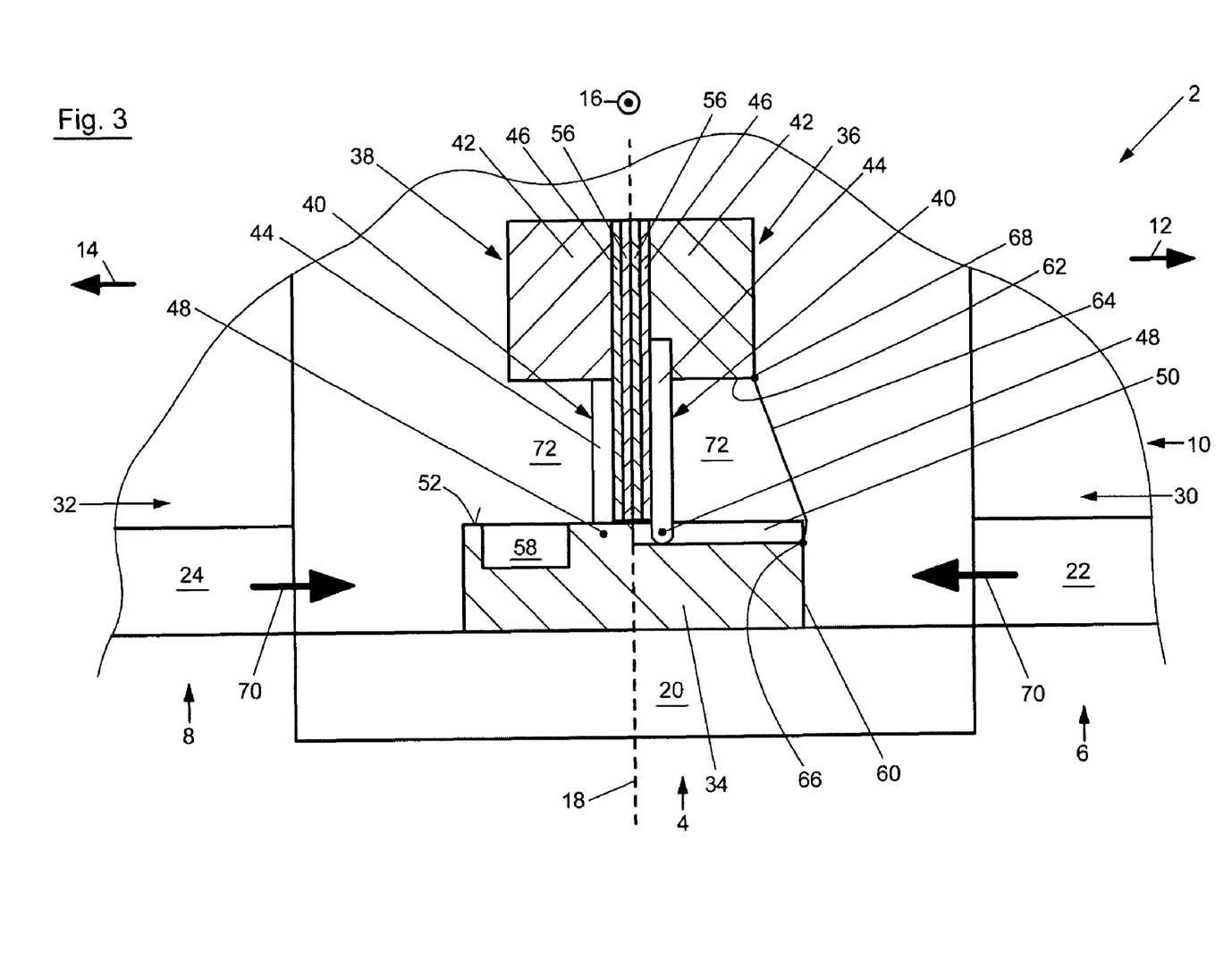
FIG. 3 shows the seating configuration of FIG. 2 with the wing rest in the armrest usage position.

Furthermore, in the armrest usage position of FIG. 3, the cover plate 46 is situated flatly on the back 54 of the cushion part 42. Nonetheless, the cover plate 46 no longer extends parallel to the back 52 of the middle backrest part 34 in the armrest usage position, but rather perpendicular to the cited back 52. The receptacle depression 58 in the back 52 of the middle backrest part 34 is thus no longer concealed by the cover plate 46, so that the receptacle depression 58 and/or the objects therein are now accessible, as shown on the left side in FIG. 3.

Furthermore, for the wing rest 36, in contrast, the elastic planar formation 64 causes covering of the intermediate space 72 in the transverse direction 12. In this way, the intermediate space 72 is implemented as essentially tubular, the intermediate space 72 being accessible via an opening pointing forward in the seat direction 16 and/or an opening pointing to the rear opposite to the seat direction 16. Objects, such as newspapers or bottles, may thus be inserted from the front or rear into the intermediate space 72 of the wing rest 36 and securely accommodated.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle seat, comprising:
    a backrest pivotable from an essentially upright usage position into an essentially horizontal non-usage position; and
    a wing rest comprising a support part and a cushion part, the support part linked on a middle backrest part in such a way that the wing rest is pivotable in a non-usage position of the backrest from a lower armrest non-usage position around a pivot axis extending in a seat direction into an upper armrest usage position forming an armrest, the cushion part is situated above the middle backrest part defining an intermediate space between the cushion part and the middle backrest part,
    wherein the support part has a cover plate, which covers the intermediate space in a transverse direction ; wherein the cover plate is configured to cover a back of the middle backrest part in the lower armrest non-usage position of the wing rest and extends flatly substantially parallel to the back of the middle backrest part; wherein the support part has at least one pivot arm, which is linked on the middle backrest part so that the pivot arm is pivotable around the pivot axis, the cover plate configured to cover the pivot arm in the transverse direction in the upper armrest usage position of the wing rest; and wherein the pivot arm lies in an elongate depression in the back of the middle backrest part in the lower armrest non-usage position and is situated at least substantially flush with the back of the middle barest part.

2. The motor vehicle seat according to claim 1, wherein the cover plate extends over at least one of an entire length of the intermediate space or a height of the intermediate space.

3. The motor vehicle seat according to claim 2, wherein the cover plate is supported flatly on a back of the middle backrest part in the lower armrest non-usage position of the wing rest.

4. The motor vehicle seat according to claim 1, wherein a receptacle depression is provided in the back of the middle backrest part, the receptacle depression is concealed by the cover plate in the lower armrest non-usage position of the wing rest and is accessible in the upper armrest usage position of the wing rest.

5. The motor vehicle seat according to claim 1, wherein the cover plate of the support part is situated substantially flat on a back of the cushion part in the lower armrest non-usage position.

6. The motor vehicle seat according to claim 1, wherein a side of the cover plate facing toward the intermediate space is provided with a soft cover layer.

7. The motor vehicle seat according to claim 1, further comprising a planar formation situated on the cushion part and on the middle backrest part and covers the intermediate space in an opposing transverse direction.

8. The motor vehicle seat according to claim 7, wherein the planar formation is implemented as at least one of a flexible or foldable formation.

9. The motor vehicle seat according to one of claims 7, wherein the planar formation is situated between a first transverse side and a second traverse side that face toward one another.

10. The motor vehicle seat according to one of claim 7, wherein the intermediate space is tubular, having at least one of an opening pointing forward in the seat direction or an opening pointing to the rear opposite to the seat direction.

11. The motor vehicle seat according to claim 1, wherein the cover plate is situated substantially parallel in the lower armrest non-usage position and substantially perpendicular in the upper armrest usage position to a back of the middle backrest part.

12. The motor vehicle seat according to claim 1, wherein the motor vehicle seat has a second wing rest on the middle backrest part.

13. A seating configuration, comprising:
a first motor vehicle seat, comprising:
- a backrest pivotable from an essentially upright usage position into an essentially horizontal non-usage position;
- a wing rest comprising a support part and a cushion part fastened on the wing rest, the support part linked on a middle backrest part in such a way that the wing rest is pivotable in a non-usage position of the backrest, from a lower armrest non-usage position around a pivot axis extending in a seat direction into an upper armrest usage position to form an armrest, in which the cushion part is situated above the middle backrest part while defining an intermediate space between the cushion part and the middle backrest part,
- wherein the support part has a cover plate, which covers the intermediate space in a transverse direction wherein the cover plate is configured to cover a back of the middle backrest part in the lower armrest non-usage position of the wing rest and extends flatly substantially parallel to the back of the middle backrest part; wherein the support part has at least one pivot arm, which is linked on the middle backrest part so that the pivot arm is pivotable around the pivot axis, the cover plate configured to cover the pivot arm in the transverse direction in the upper armrest usage position of the wing rest; and wherein the pivot arm lies in an elongate depression in the back of the middle backrest part in the lower armrest non-usage position and is situated at least substantially flush with the back of the middle barest part; and
- a second motor vehicle seat situated adjacent to the first motor vehicle seat in a row of seats, the wing rest situated on a side of the first motor vehicle seat facing toward the second motor vehicle seat.

14. The seating configuration according to claim 13, further comprising a third motor vehicle seat in the row of seats, the first motor vehicle seat situated between the second motor vehicle seat and the third motor vehicle seat.

* * * * *